(12) United States Patent
Kitazoe et al.

(10) Patent No.: US 9,788,245 B2
(45) Date of Patent: *Oct. 10, 2017

(54) DELIVERY OF HANDOVER COMMAND

(71) Applicant: QUALCOMM Incorporated, San Diego, CA (US)

(72) Inventors: Masato Kitazoe, Tokyo (JP); Sai Yiu Duncan Ho, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/183,057

(22) Filed: Jun. 15, 2016

(65) Prior Publication Data

US 2016/0295469 A1    Oct. 6, 2016

Related U.S. Application Data

(63) Continuation of application No. 12/141,823, filed on Jun. 18, 2008, now Pat. No. 9,392,504.
(Continued)

(51) Int. Cl.
*H04W 36/00* (2009.01)
*H04W 24/10* (2009.01)
(Continued)

(52) U.S. Cl.
CPC ..... *H04W 36/0072* (2013.01); *H04L 41/0806* (2013.01); *H04L 69/08* (2013.01);
(Continued)

(58) Field of Classification Search
CPC ............ H04W 36/0072; H04W 24/10; H04W 36/0055; H04W 36/30; H04W 76/046
(Continued)

(56) References Cited

U.S. PATENT DOCUMENTS 6,850,494 B1    2/2005    Bender
6,983,148 B1    1/2006    Kirla
(Continued)

FOREIGN PATENT DOCUMENTS

EP    1107633 A1    6/2001
EP    1232667       8/2002
(Continued)

OTHER PUBLICATIONS

Taiwan Search Report—TW102117469—TIPO—Oct. 6, 2014.
(Continued)

*Primary Examiner* — Ronald B Abelson

(57) ABSTRACT

A delta configuration is transmitted to a UE requesting a handover wherein the delta configuration details changes that are required for the current UE configuration in order to execute the handover. The handover is initiated via a measurement report transmitted to a currently serving source eNode B from the UE. The measurement report can comprise one or more of current radio conditions, current UE configuration or a preferred target eNode B if the handover is a inter eNode B handover. In a inter eNB handover, the current UE configuration is forwarded to the preferred target eNode B by the source eNode B. The target eNode B generates the delta configuration and transmits it to the source eNode B in a transparent container which is subsequently forwarded to the UE.

30 Claims, 14 Drawing Sheets

Related U.S. Application Data

(60) Provisional application No. 60/945,070, filed on Jun. 19, 2007.

(51) Int. Cl.
  *H04W 76/04* (2009.01)
  *H04L 12/24* (2006.01)
  *H04L 29/06* (2006.01)
  *H04W 36/30* (2009.01)

(52) U.S. Cl.
  CPC ....... *H04W 24/10* (2013.01); *H04W 36/0055* (2013.01); *H04W 36/30* (2013.01); *H04W 76/046* (2013.01)

(58) Field of Classification Search
  USPC .......................................................... 370/331
  See application file for complete search history.

(56) References Cited

U.S. PATENT DOCUMENTS

| | | | |
|---|---|---|---|
| 7,031,391 B1* | 4/2006 | Riffee | H04N 7/52 375/240.27 |
| 7,295,842 B2 | 11/2007 | Yang et al. | |
| 7,596,378 B1 | 9/2009 | Nizri et al. | |
| 8,804,656 B2 | 8/2014 | Kitazoe | |
| 2002/0032032 A1 | 3/2002 | Haumont et al. | |
| 2002/0066011 A1 | 5/2002 | Vialen et al. | |
| 2002/0160785 A1* | 10/2002 | Ovesjo | H04W 36/0066 455/453 |
| 2002/0191556 A1* | 12/2002 | Krishnarajah | H04W 28/06 370/329 |
| 2004/0002337 A1 | 1/2004 | Wheeler et al. | |
| 2006/0003767 A1 | 1/2006 | Kim et al. | |
| 2006/0056448 A1 | 3/2006 | Zaki et al. | |
| 2007/0047493 A1 | 3/2007 | Park et al. | |
| 2007/0047495 A1 | 3/2007 | Ji et al. | |
| 2007/0224993 A1 | 9/2007 | Forsberg | |
| 2007/0293224 A1 | 12/2007 | Wang et al. | |
| 2008/0240439 A1 | 10/2008 | Mukherjee et al. | |
| 2009/0046656 A1 | 2/2009 | Kitazoe et al. | |
| 2014/0307711 A1 | 10/2014 | Kitazoe | |

FOREIGN PATENT DOCUMENTS

| | | |
|---|---|---|
| EP | 1583292 A1 | 10/2005 |
| EP | 1713207 A1 | 10/2006 |
| GB | 2414898 A | 12/2005 |
| JP | 2004343559 A | 12/2004 |
| JP | 2006245913 A | 9/2006 |
| WO | WO-0027158 | 5/2000 |
| WO | WO-0124557 | 4/2001 |
| WO | WO-0189157 | 11/2001 |
| WO | WO-02089502 A2 | 11/2002 |
| WO | WO-03043355 A1 | 5/2003 |
| WO | WO-2007007990 A1 | 1/2007 |
| WO | WO-2007066882 A1 | 6/2007 |
| WO | WO-2007149509 A2 | 12/2007 |
| WO | WO-2008055169 | 5/2008 |

OTHER PUBLICATIONS

3GPP TR 25.912 v0.2.0 Technical Report : "Technical Specification Group Radio Access Network; Feasibility Study for Evolved UTRA and UTRAN (Release 7)" 3rd Generation Partnership Project (3GPP); (Jun. 1, 2006), pp. 1-57, XP002455821.

"3rd Generation Partnership Project; Technical Specification Group Radio Access Network; Evolved Universal Terrestrial Radio Access (E-UTRA) and Evolved Universal Terrestrial Radio Access Network (E-UTRAN); Radio interface protocol aspects (release 7)" 3GPP TR 25.813 V7.1.0, vol. 25.813, No. V7.1.0, Sep. 1, 2006, pp. 1-41, XP002478963.

Barth U., "3GPP Long-Term Evolution/System Architecture Evolution—Overview", Alcatel, Sep. 2006, http://cc.ee.ntu.edu.tw/farn/courses/FMV/01-3GPP_LTE-SAE_Overview_Sep06.pdf.

Co-pending U.S. Appl. No. 60/895,128, filed Mar. 15, 2007.

Ericsson: "S1 Procedure Descriptions: S1 Handover Procedures" 3GPP TSG-RAN WG3 #56, R3-070917, [Online] (May 7-11, 2007), pp. 1-9, XP002501849.

Ericsson, "Integrity protection and ciphering at GSM to UMTS handover", ETSI STC SMG2 handover ad-Hoc, Mar. 6-8, 2000.

Ericsson: "Some Aspects of the Handover Signaling in LTE" 3GPP TSG-RAN WG2 #57, R2-070567, [Online] (Feb. 12-16, 2007), pp. 1-4, XP002501848.

European Search Report—EP12174080—Search Authority—Munich—Aug. 8, 2012.

International Search Report—PCT/US08/067535, International Search Authority—European Patent Office—Nov. 13, 2008.

Qualcomm Europe: "Delivery of HO Command" 3GPP TSG-RAN WG2 Meeting #58-BIS, R2-072786, [Online] (Jun. 25-29, 2007), pp. 1-3, XP002501847.

Samsung: "Future Converged radio access system" (3GPP Perspective), Jun. 27, 2006, pp. 1-30, XP002500389.

Taiwan Search Report—TW097122902—TIPO—Jan. 12, 2012.
Taiwan Search Report—TW097122902—TIPO—Oct. 16, 2012.
Written Opinion—PCT/US08/067535, International Search Authority—European Patent Office—Nov. 13, 2008.

* cited by examiner

DELIVERY OF HANDOVER COMMAND

CROSS-REFERENCE TO RELATED APPLICATIONS

This application is a continuation of U.S. patent application Ser. No. 12/141,823 filed on Jun. 18, 2008 and entitled "DELIVERY OF HANDOVER COMMAND," which claims the benefit of U.S. Provisional Patent Application Ser. No. 60/945,070 filed on Jun. 19, 2007 and entitled "A METHOD AND APPARATUS DELIVERY OF HANDOVER COMMAND." These applications are incorporated herein by reference in their entireties.

BACKGROUND OF THE INVENTION

Wireless communication systems are widely deployed to provide various types of communications such as voice, data, video, etc. These systems may be multiple-access systems capable of supporting communication with multiple access terminals by sharing available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems. Typically, a wireless communication system comprises several base stations, wherein each base station communicates with a mobile station using a forward link and each mobile station (or access terminal) communicates with base station(s) using a reverse link.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out (SISO), multiple-in-signal-out (MISO) or a multiple-in-multiple-out (MIMO) system.

A MIMO system employs multiple (NT) transmit antennas and multiple (NR) receive antennas for data transmission. A MIMO channel formed by the NT transmit and NR receive antennas may be decomposed into NS independent channels, which are also referred to as spatial channels, where $N_S \leq \min\{N_T, N_R\}$. Each of the NS independent channels corresponds to a dimension. The MIMO system can provide improved performance (e.g., higher throughput and/or greater reliability) if the additional dimensionalities created by the multiple transmit and receive antennas are utilized.

A MIMO system supports a time division duplex (TDD) and frequency division duplex (FDD) systems. In a TDD system, the forward and reverse link transmissions are on the same frequency region so that the reciprocity principle allows the estimation of the forward link channel from the reverse link channel. This enables the eNB (Evolved Node B) to extract transmit beamforming gain on the forward link when multiple antennas are available at the eNB.

A UE requires an eNB serving a cell in which it is currently located to facilitate communications. However, when the UE moves from its current location, it may cross over into coverage area associated with another eNB which may be able to better serve the UE. This requires the UE to perform handover from the currently serving eNB to the new eNB. However, the signaling between the UE and the eNBs needs to be optimized in order to provide reliable communications.

SUMMARY OF THE INVENTION

The following presents a simplified summary of the claimed subject matter in order to provide a basic understanding of some aspects of the claimed subject matter. This summary is not an extensive overview of the claimed subject matter. It is intended to neither identify key or critical elements of the claimed subject matter nor delineate the scope of the claimed subject matter. Its sole purpose is to present some concepts of the claimed subject matter in a simplified form as a prelude to the more detailed description that is presented later.

A method for executing a handover within a wireless communication system is disclosed in accordance with this aspect. A measurement report comprising a current configuration associated with a UE is received by serving eNB. In response, it transmits a delta configuration comprising one or more changes to be made to the current UE configuration in order to facilitate the handover. If the handover is a inter eNB (Enhanced Node B) handover from a source eNB to a different target eNB the measurement report is transmitted from the UE to the source eNB and comprises information regarding a preferred target eNB. The source eNB forwards the current UE configuration to the preferred target eNB. In response, the target eNB generates the delta configuration with the changes and transmits it to the source eNB in a transparent container. The source eNB forwards the transparent container to the UE without gaining knowledge of information comprised in the container. Another aspect relates to the handover being an intra eNB handover. In this case, a handover message transmitted to the UE facilitating the handover comprises a choice between a local configuration and a transparent container.

A further aspect relates to determining from the measurement report, if one or more of critical or non-critical information associated with the handover can be forwarded to the UE. In accordance with this aspect, the source eNB determines if one or more of the critical or non-critical information can be transmitted to the UE and based at least on the determination, it receives the appropriate information from a target eNB which is subsequently forwarded to the UE. Based on one or more of radio conditions associated with the UE as derived from the measurement report or the source eNB only the critical information can be forwarded to the UE. In this case either the source eNB informs the target eNB of forwarding only the critical information or the UE communicates the information it received from the source eNB to the target eNB upon completion of the handover.

Another aspect relates to an apparatus for facilitating a handover within a communication system. The apparatus comprises a receiver that receives at least a measurement report comprising information regarding a current configuration of a UE desiring a handover. A processor also comprised within the apparatus, generates at least one handover message comprising a delta configuration for the UE wherein the delta configuration indicates one or more changes required in the current UE configuration in order to facilitate the handover and provides it to a transmitter which transmits the message to the UE.

Another aspect relates to a computer program product comprising a computer-readable medium comprising: code for causing at least a computer to receive a measurement report comprising a current configuration associated with a UE; code for causing at least a computer to receive a delta configuration comprising one or more changes to be made to the current UE configuration; and code for causing at least a computer to transmit the delta configuration to the UE to facilitate handover of the UE. The code facilitates receiving a measurement report comprising a current UE configuration from the UE. In response, the code further facilitates transmitting a delta configuration comprising one or more changes to be made to the current UE configuration to the UE thereby enabling a handover of the UE. In an inter eNB handover, the instructions further facilitate forwarding a transparent container comprising the delta configuration to the UE without a need to decode the contents of the container.

Another aspect relates to a system for facilitating handover. The system comprises means for receiving one or more measurement reports from one or more UEs detailing a current configuration associated with the UEs. It also comprises means for analyzing in order to analyze the measurement reports to identify at least one UE requesting a handover. A message comprising at least a delta configuration that specifies one or more changes to the current configuration of the UE is transmitted to the UE by means for transmitting, also comprised within the system.

In another aspect, a method of executing an inter eNB handover in a wireless communication system is disclosed. The method comprises receiving a request for a handover wherein the request comprises information regarding a current configuration associated with a UE requesting the handover. The method also facilitates determining a delta configuration specifying one or more changes to the current configuration that are required to facilitate the handover and transmitting the delta configuration in a transparent container.

In yet another aspect, an apparatus for facilitating a handover within a communication system is disclosed. The apparatus comprises a receiver that receives information regarding a current configuration of a UE requesting a handover. A processor, also comprised within the apparatus, determines at least a delta configuration for the UE wherein the delta configuration indicates one or more changes required in the current UE configuration in order to facilitate the handover. A transmitter receives the delta configuration and transmits the delta configuration in a transparent container.

Another aspect relates to a computer program product comprising a computer-readable medium comprising: code for causing at least a computer to receive a request for a handover wherein the request comprises information regarding a current configuration associated with a UE requesting the handover; code for causing at least a computer to determine a delta configuration specifying one or more changes to the current configuration that are required to facilitate the handover; and code for causing at least a computer to transmit the delta configuration in a transparent container.

A method for executing a handover within a wireless communication system is disclosed in another aspect. The method comprises steps of transmitting a measurement report comprising a current configuration of a UE, receiving a delta configuration comprising one or more changes to be made to the current configuration and implementing the delta configuration to facilitate the handover. If the handover is a inter eNB (Enhanced Node B) handover from a source eNB to a preferred target eNB, the preferred target eNB is indicated to the source eNB in the measurement report in addition to information regarding radio conditions associated with the UE. In response, the delta configuration is received in a transparent container from the source eNB at the UE. Additionally, the method further comprises the step of receiving one or more of critical or non-critical information from the source eNB based at least on radio conditions transmitted in the measurement report. It also facilitates transmitting a message to the target eNB comprising information regarding the information received from the source eNB upon completion of the handover.

An apparatus for facilitating a handover in a wireless communication system is disclosed in accordance with yet another aspect. The apparatus comprises a processor that generates at least a measurement report comprising information regarding a current configuration and radio conditions associated with a UE. A transmitter, also comprised within the apparatus, transmits the measurement report. The apparatus also includes a receiver that receives a message comprising a delta configuration wherein the delta configuration details changes to the current configuration that are necessary to facilitate the handover.

In a further aspect, the subject innovation relates to a computer product program comprising a computer-readable medium comprising: code for causing at least a computer to transmit a measurement report comprising a current configuration of a UE; code for causing at least computer to receive a delta configuration comprising one or more changes to be made to the current configuration; and code for causing at least a computer to implement the delta configuration to facilitate the handover.

A system for facilitating a handover is disclosed in accordance with this aspect. The system comprises means for generating a measurement report including a current configuration and radio conditions associated with a UE. Means for transmitting, also comprised within the system, transmits the measurement report. The system also comprises means for receiving a handover message which includes a delta configuration that details one or more changes to the current configuration that are required to facilitate the handover.

The following description and the annexed drawings set forth in detail certain illustrative aspects of the claimed subject matter. These aspects are indicative, however, of but a few of the various ways in which the principles of the claimed subject matter may be employed and the claimed subject matter is intended to include all such aspects and their equivalents. Other advantages and distinguishing features of the claimed subject matter will become apparent from the following detailed description of the claimed subject matter when considered in conjunction with the drawings.

DESCRIPTION OF THE INVENTION

Figure 1:
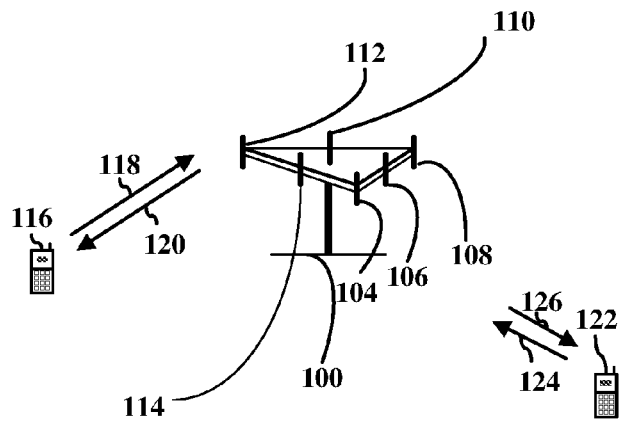
FIG. 1 illustrates a multiple access wireless communication system according to one embodiment.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

Various embodiments are now described with reference to the drawings, wherein like reference numerals are used to refer to like elements throughout. In the following description, for purposes of explanation, numerous specific details are set forth in order to provide a thorough understanding of one or more aspects. It may be evident however, that such embodiment(s) may be practiced without these specific details. In other instances, well-known structures and devices are shown in block diagram form in order to facilitate describing one or more embodiments. As used in this application, the terms "component," "module," "system," and the like are intended to refer to a computer-related entity, either hardware, firmware, a combination of hardware and software, software, or software in execution. For example, a component may be, but is not limited to being, a process running on a processor, a processor, an integrated circuit, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Various embodiments will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The word "exemplary" is used herein to mean "serving as an example, instance, or illustration." Any embodiment or design described herein as "exemplary" is not necessarily to be construed as preferred or advantageous over other embodiments or designs. The word "listening" is used herein to mean that a recipient device (eNB or UE) is receiving and processing data received on a given channel.

Various aspects can incorporate inference schemes and/or techniques in connection with transitioning communication resources. As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events, or decision theoretic, building upon probabilistic inference, and considering display actions of highest expected utility, in the context of uncertainty in user goals and intentions. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Furthermore, various aspects are described herein in connection with a subscriber station. A subscriber station can also be called a system, a subscriber unit, mobile station, mobile, remote station, access point, eNB, remote terminal, access terminal, user terminal, user agent, a user device, mobile device, portable communications device, or user equipment. A subscriber station may be a cellular telephone, a cordless telephone, a Session Initiation Protocol (SIP) phone, a wireless local loop (WLL) station, a personal digital assistant (PDA), a handheld device having wireless connection capability, or other processing device connected to a wireless modem.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art. For clarity, certain aspects of the techniques are described below for LTE, and LTE terminology is used in much of the description below.

Single carrier frequency division multiple access (SC-FDMA), which utilizes single carrier modulation and frequency domain equalization is a technique. SC-FDMA has similar performance and essentially the same overall complexity as those of OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for uplink multiple access scheme in 3GPP Long Term Evolution (LTE), or Evolved UTRA.

Referring to FIG. 1, a multiple access wireless communication system according to one embodiment is illustrated. An eNB 100 includes multiple antenna groups, wherein a first group includes antennas 104 and 106, another includes 108 and 110, and an additional group includes 112 and 114. In FIG. 1, only two antennas are shown for each antenna group, however, more or fewer antennas may be utilized for each antenna group. UE (user equipment) or AT (access terminal) 116 is in communication with antennas 112 and 114, where antennas 112 and 114 transmit information to UE 116 over forward link 120 and receive information from UE 116 over reverse link 118. UE 122 is in communication with antennas 106 and 108, where antennas 106 and 108 transmit information to UE 122 over forward link 126 and receive information from UE 122 over reverse link 124. In a FDD system, communication links 118, 120, 124 and 126 may use different frequencies for communication. For example, forward link 120 may use a different frequency than that used by reverse link 118. Each group of antennas and/or the area in which they are designed to communicate is often referred to as a sector of the access point or eNB. In the embodiment, antenna groups are each designed to communicate to UEs in a sector within the areas covered by eNB 100.

In communication over forward links 120 and 126, the transmitting antennas of eNB 100 utilize beamforming in order to improve the signal-to-noise ratio of forward links for the different UEs 116 and 124. Also, an eNB using beamforming to transmit to UEs scattered randomly through its coverage area causes less interference to UEs in neighboring cells than an eNB transmitting through a single antenna to all its UEs.

An eNB may be a fixed station used for communicating with the terminals and may also be referred to as an access point, a Node B, an enhanced Node B (eNB) or some other terminology. An access terminal (AT) may also be called a user equipment (UE), a wireless communication device, terminal, or some other terminology.

Figure 2:
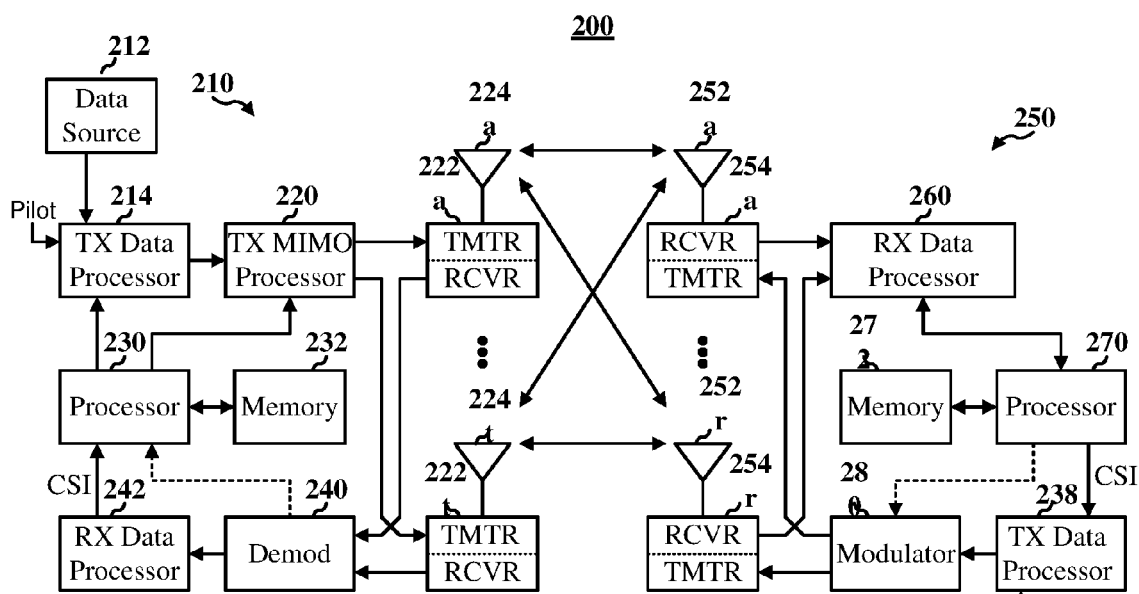
FIG. 2 is a block diagram of an embodiment of an eNB and an access terminal (or a UE) in a MIMO system.

FIG. 2 is a block diagram of an embodiment of an eNB 210 and a access terminal (AT) or user equipment (UE) 250 in a MIMO system 200. At the eNB 210, traffic data for a number of data streams is provided from a data source 212 to a transmit (TX) data processor 214.

In an embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiving system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides NT modulation symbol streams to NT transceivers (TMTR) 222a through 222t. In certain embodiments, TX MIMO processor 220 applies beamforming weights to the symbols of the data streams and to the antenna from which the symbol is being transmitted.

Each transceiver 222 receives and processes a respective symbol stream to provide one or more analog signals, and further conditions (e.g., amplifies, filters, and upconverts) the analog signals to provide a modulated signal suitable for transmission over the MIMO channel. NT modulated signals from transceivers 222a through 222t are then transmitted from NT antennas 224a through 224t, respectively.

At the UE 250, the transmitted modulated signals are received by NR antennas 252a through 252r and the received signal from each antenna 252 is provided to a respective transceiver (RCVR) 254a through 254r. Each transceiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the NR received symbol streams from NR transceivers 254 based on a particular transceiver processing technique to provide NT "detected" symbol streams. The received symbols or other information can be stored in an associated memory 272. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at the eNB 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. For example, reverse link communications can comprise periodic measurement reports from the UE 250 to the serving eNB 210. These measurement reports can comprise one or more of radio conditions associated with the UE, or if a handover is desired, information regarding a preferred target eNB, or the reverse link communications can be utilized to signal if one or more of critical or non-critical information has been received by the UE in accordance with various aspects detailed infra. Information received on the reverse link can be stored in an associated memory 232. The reverse link message is then processed by a TX data processor 238, which also receives traffic data for a number of data streams from a data source 236, modulated by a modulator 280, conditioned by transceivers 254a through 254r, and transmitted back to transmitting system 210.

At the eNB 210, the modulated signals from receiving system 250 are received by antennas 224, conditioned by transceivers 222, demodulated by a demodulator 240, and processed by a RX data processor 242 to extract the reserve link message transmitted by the transceiver system 250. Processor 230 then determines which pre-coding matrix to use for determining the beamforming weights then processes the extracted message.

In an aspect, logical channels are classified into Control Channels and Traffic Channels. Logical Control Channels comprises Broadcast Control Channel (BCCH) which is DL channel for broadcasting system control information. Paging Control Channel (PCCH) which is DL channel that transfers paging information. Multicast Control Channel (MCCH) which is Point-to-multipoint DL channel used for transmitting Multimedia Broadcast and Multicast Service (MBMS) scheduling and control information for one or several MTCHs. Generally, after establishing RRC connection this channel is only used by UEs that receive MBMS. Dedicated Control Channel (DCCH) is Point-to-point bi-directional channel that transmits dedicated control information and used by UEs having an RRC connection. In aspect, Logical Traffic Channels comprises a Dedicated Traffic Channel (DTCH) which is Point-to-point bi-directional channel, dedicated to one UE, for the transfer of user information. Also, a Multicast Traffic Channel (MTCH) for Point-to-multipoint DL channel for transmitting traffic data.

In an aspect, Transport Channels are classified into DL and UL. DL Transport Channels comprises a Broadcast Channel (BCH), Downlink Shared Channel (DL-SCH) and a Paging Channel (PCH), the PCH for support of UE power saving (DRX cycle is indicated by the network to the UE), broadcasted over entire cell and mapped to PHY resources which can be used for other control/traffic channels. DL transport channel associated with MBMS is Multicast Channel (MCH) The UL Transport Channels comprises a Random Access Channel (RACH), Uplink Shared Data Channel (UL-SDCH) and plurality of PHY channels. The PHY channels comprises a set of DL channels and UL channels.

The DL PHY channels and signals comprises:
Reference signal (RS)
Primary and Secondary Synchronization Signals (PSS/SSS)
Physical Downlink Shared Channel (PDSCH)
Physical Downlink Control Channel (PDCCH)
Physical Multicast Channel (PMCH)
Physical HARQ Indicator Channel (PHICH)
Physical Control Format Indicator Channel (PCFICH)
   The UL PHY Channels comprises:
Physical Random Access Channel (PRACH)
Physical Uplink Control Channel (PUCCH)
   Channel Quality Indicator (CQI)
   Precoding Matrix Indicator (PMI)
   Rank Indicator (RI)
   Scheduling request (SR)
   Uplink ACK/NAK
Physical Uplink Shared Channel (PUSCH)
Sounding Reference Signal (SRS)
   In an aspect, a channel structure is provided that preserves low PAR (at any given time, the channel is contiguous or uniformly spaced in frequency) properties of a single carrier waveform.

Figure 3:
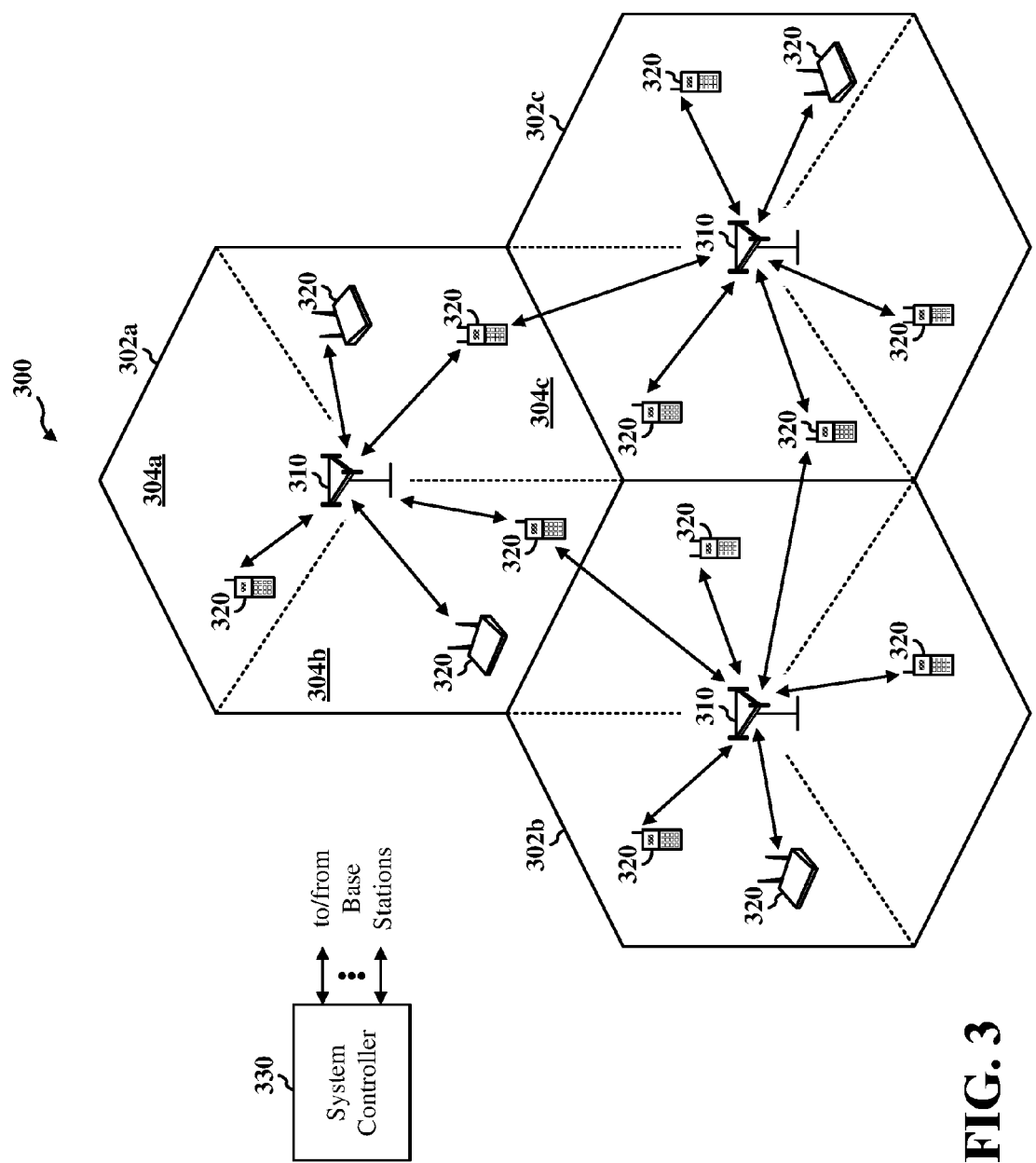
FIG. 3 is an illustration of a wireless multiple-access communication system in accordance with various aspects described herein.

For the purposes of the present document, the following abbreviations apply:
AM Acknowledged Mode
AMD Acknowledged Mode Data
ARQ Automatic Repeat Request
BCCH Broadcast Control CHannel
BCH Broadcast CHannel
C- Control-
CCCH Common Control CHannel
CCH Control CHannel
CCTrCH Coded Composite Transport Channel
CP Cyclic Prefix
CRC Cyclic Redundancy Check
CTCH Common Traffic CHannel
DCCH Dedicated Control CHannel
DCH Dedicated CHannel
DL DownLink
DSCH Downlink Shared CHannel
DTCH Dedicated Traffic CHannel
FACH Forward link Access CHannel
FDD Frequency Division Duplex
L1 Layer 1 (physical layer)
L2 Layer 2 (data link layer)
L3 Layer 3 (network layer)
LI Length Indicator
LSB Least Significant Bit
MAC Medium Access Control
MBMS Multimedia Broadcast Multicast Service
MCCH MBMS point-to-multipoint Control CHannel
MRW Move Receiving Window
MSB Most Significant Bit
MSCH MBMS point-to-multipoint Scheduling CHannel
MTCH MBMS point-to-multipoint Traffic CHannel
PCCH Paging Control CHannel
PCH Paging CHannel
PDU Protocol Data Unit
PHY PHYsical layer
PhyCH Physical CHannels
RACH Random Access CHannel
RLC Radio Link Control
RRC Radio Resource Control
SAP Service Access Point
SDU Service Data Unit
SHCCH SHared channel Control CHannel
SN Sequence Number SUFI SUper FIeld
TCH Traffic CHannel
TDD Time Division Duplex
TFI Transport Format Indicator
TM Transparent Mode
TMD Transparent Mode Data
TTI Transmission Time Interval
U- User-
UE User Equipment
UL UpLink
UM Unacknowledged Mode
UMD Unacknowledged Mode Data
UMTS Universal Mobile Telecommunications System
UTRA UMTS Terrestrial Radio Access
UTRAN UMTS Terrestrial Radio Access Network
MBSFN multicast broadcast single frequency network
MCE MBMS coordinating entity
MCH multicast channel
DL-SCH downlink shared channel
MSCH MBMS control channel
PDCCH physical downlink control channel
PDSCH physical downlink shared channel
MBSFN multicast broadcast single frequency network
MCE MBMS coordinating entity
MCH multicast channel
DL-SCH downlink shared channel
MSCH MBMS control channel
PDCCH physical downlink control channel
PDSCH physical downlink shared channel
PUCCH physical uplink control channel
PUSCH physical uplink shared channel FIG. 3 is an illustration of a wireless multiple-access communication system 300 in accordance with various aspects. In one example, the wireless multiple-access communication system 300 includes multiple eNBs 310 and multiple UEs 320. Each eNB 310 provides communication coverage for a particular geographic area 302 (e.g., 302a, 302b, 302c). The term "cell" can refer to an eNB and/or its coverage area depending on the context in which the term is used. To improve system capacity, an access terminal coverage area may be partitioned into multiple smaller areas, e.g., three smaller areas 304a, 304b, and 304c. Each smaller area is served by a respective eNB. The term "sector" can refer to an eNB and/or its coverage area depending on the context in which the term is used. For a sectorized cell, the eNBs for all sectors of that cell are typically co-located within the base station for the cell. The signaling transmission techniques described herein may be used for a system with sectorized cells as well as a system with un-sectorized cells. For simplicity, in the following description, the term "base station" or eNB is used generically for a station that serves a sector as well as a station that serves a cell.

Terminals or UEs 320 are typically dispersed throughout the system, and each UE may be fixed or mobile. A terminal may also be called, and may contain some or all of the functionality of, a mobile station, a user equipment, and/or some other device. A terminal may be a wireless device, a cellular phone, a personal digital assistant (PDA), a wireless modem card, and so on. A terminal may communicate with zero, one, or multiple base stations on the forward and reverse links at any given moment.

For a centralized architecture, a system controller 330 couples to APs 310 and provides coordination and control for these base stations. System controller 330 may be a single network entity or a collection of network entities. For a distributed architecture, the eNBs 310 may communicate with one another as needed.

One or more aspects of a wireless communication system design are described that support full & half duplex FDD (Frequency Division Duplex) and TDD (Time Division Duplex) modes of operation, with support for scalable bandwidth. However, this need not be the case, and other modes may also be supported, in addition to, or in lieu, of the previous modes. Further, it should be noted that the concepts and approaches herein, need not be used in conjunction with any other of the concepts or approaches described herein.

When a UE moves from one cell to another each serviced by a different eNB, a handover occurs wherein the UE moves from a source eNB currently servicing the UE to a target eNB that is better suited to service the UE due to changing radio conditions. This determination is based on measurement reports received from the UE which can comprise neighbor cell measurements sent by the UE. The source eNB controls other aspects of the handover procedure such as, UE measurement reporting such as the periodicity of Channel Quality Information (CQI) reports, transfer of UE context from the source eNB to the target eNB etc. For example, the physical layer at the source eNB can process the measurement reports from the UE and send appropriate indications to the upper layers.

Figure 4:
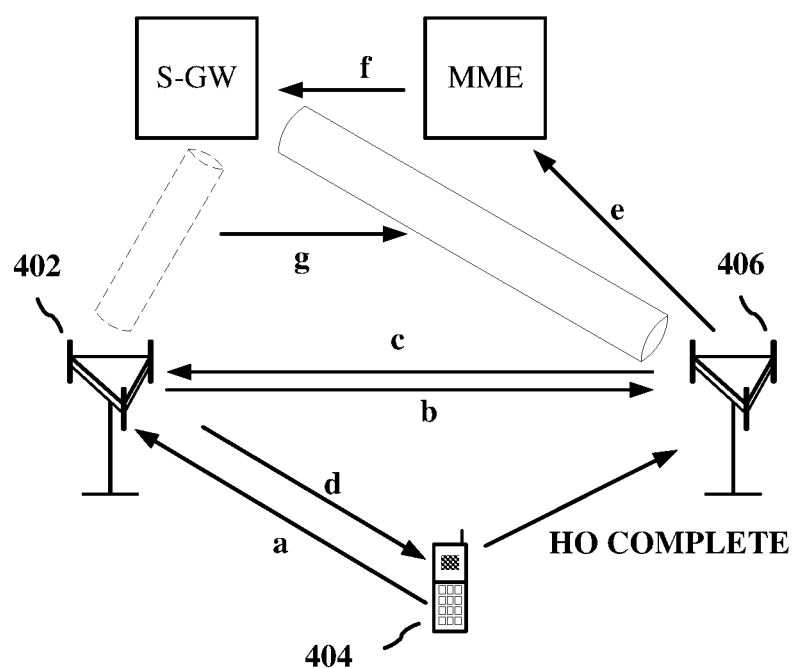
FIG. 4 illustrates a handover procedure executed in accordance with an aspect.

FIG. 4 illustrates a handover procedure executed in accordance with an aspect. In the figure, 402 is a source or serving eNB that maintains the coupling between mobility tunnels and radio bearers, and also maintains a UE context associated with UE 404. When the UE 404 moves from one cell to another, the source eNB 402 begins preparation for a handover procedure by sending the coupling information and the UE context to a selected target eNB 406. This is triggered by a measurement report from the UE 404 that signals its current radio conditions based on which, the target eNB 406 is selected. Upon the target eNB 406 signaling that it is ready to take on the UE 404, the source eNB 402 commands the UE 404 to change its radio bearer to the target eNode 406. For the handoff to be complete, a serving gateway (S-GW) must update its log with the new target eNB 406 that is now serving the UE 404. Accordingly, a MME (Mobility Management Entity) coordinates a mobility tunnel switch from the source eNB 402 to the target eNB 406. MME can be a signaling only entity that may not receive user IP packets but facilitates UE's mobility. It triggers the update at the S-GW based on the signaling received from the target eNB 406 indicating that the radio bearer was successfully transferred.

In accordance with the procedure described above, when the UE 404 needs to change its serving eNB, it sends a measurement report including a preferred target eNB 406 to the source eNB 402. This is indicated as uplink communication (a) from the UE to the source eNB in the figure. Accordingly, the source eNB transfers the UE context to the target eNB with in a HO (handover) Request (b). The target eNB signals its acceptance of the HO Request in a HO Accept message (c). Upon receiving the HO Accept message from the target eNB, the source eNB signals the HO Command to the UE (d). In different aspects further detailed infra, the target eNB can transmit the HO Command to the source eNB which forwards it to the UE. A HO Complete message from the UE to the target eNB can be utilized by the target eNB to trigger the MME as shown at (e) for user plane update at the S-GW (f). Thus, the mobility tunnel is switched from the source eNB 402 to the target eNB 406 as shown at (g).

Figure 5:
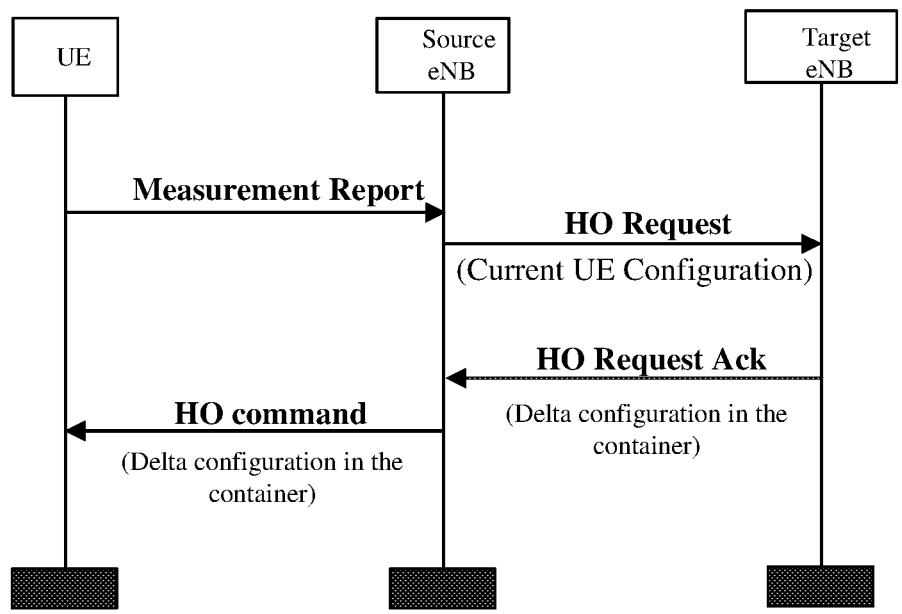
FIG. 5 shows a more detailed operation of the system executing an inter eNB handover procedure.

FIG. 5 shows a more detailed operation of the system described above. As mentioned above, a handover from the source eNB currently serving a UE to a target eNB (an 'inter eNB handover') occurs upon a signaling from the UE regarding the preferred target eNB as indicated in the measurement report. In accordance with a further aspect, the source eNB signals current configuration of the requesting UE to the target eNB in a HO Request message. This information can be used by the target eNB to formulate a response including a complete or delta configuration for the UE in a transparent container. Therefore, the target eNB compares the current UE configuration to a configuration required by the target eNB and generates the delta configuration comprising changes required by the target eNB in the current UE configuration. The delta configuration can be sent in a transparent container from the target eNB to the source eNB in a HO Request Acknowledgement message. The transparent container facilitates the source eNB to forward the delta configuration to the UE without a necessity to know the detailed contents of the container. This mechanism allows the combination of the source and the target eNBs which may support different protocol version or may have different policy for radio configurations (e.g. due to from different vendor). The UE can receive the transparent container forwarded by the source eNB in a HO Command message. Hence, while it is beneficial to include the measurement configuration that the UE needs to use in the target eNB in the handover message, it is also important to try to reduce the actual size of the handover message for the reliable delivery.

Accordingly, a further aspect relates to a scheme of transmission that allows the source eNB to choose information transmitted in the handover message thereby reducing information that can be included in the messages to the UE. For example, a target eNB may not have knowledge on whether the situation at the source eNB (eNB) permits transmission of non-critical information along with the critical information. Therefore, the source eNB indicates in the HO REQUEST message whether the non-critical configuration can be transmitted. The target eNB forwards the non-critical configuration to the source eNB in the HO REQUEST Acknowledgement message only if it is allowed. In accordance with this aspect, no other messages need to be transmitted over X2 in addition to HO REQUEST/HO REQUEST ACKNOWLEDGE messages. However it does not address the case where the non-critical configuration cannot be reliably delivered to the UE due to a sudden radio condition change by the time HO Command is transmitted. The only choice the source eNB has with this option is to try to transmit critical and non-critical information. Although, the extra signaling from the source eNB or the UE regarding information transmitted during the handover can be contrary to conventional teachings, it results in a reliable handover of the UE which aids in improving service.

Therefore, a scheme of transmission wherein the source eNB can choose whether to transmit the non-critical configuration in the handover message is advantageous within a wireless communication system. In this aspect, the target eNB can transmit non-critical information to the source eNB regardless of the signaling from the source eNB with respect to the non-critical information. If the non-critical information is not transmitted to the UE, the source eNB can signal the non-transmission to the target eNB. Alternatively, the UE can signal to the target eNB the information it received from the source eNB via the HO COMPLETE message.

Figure 6:
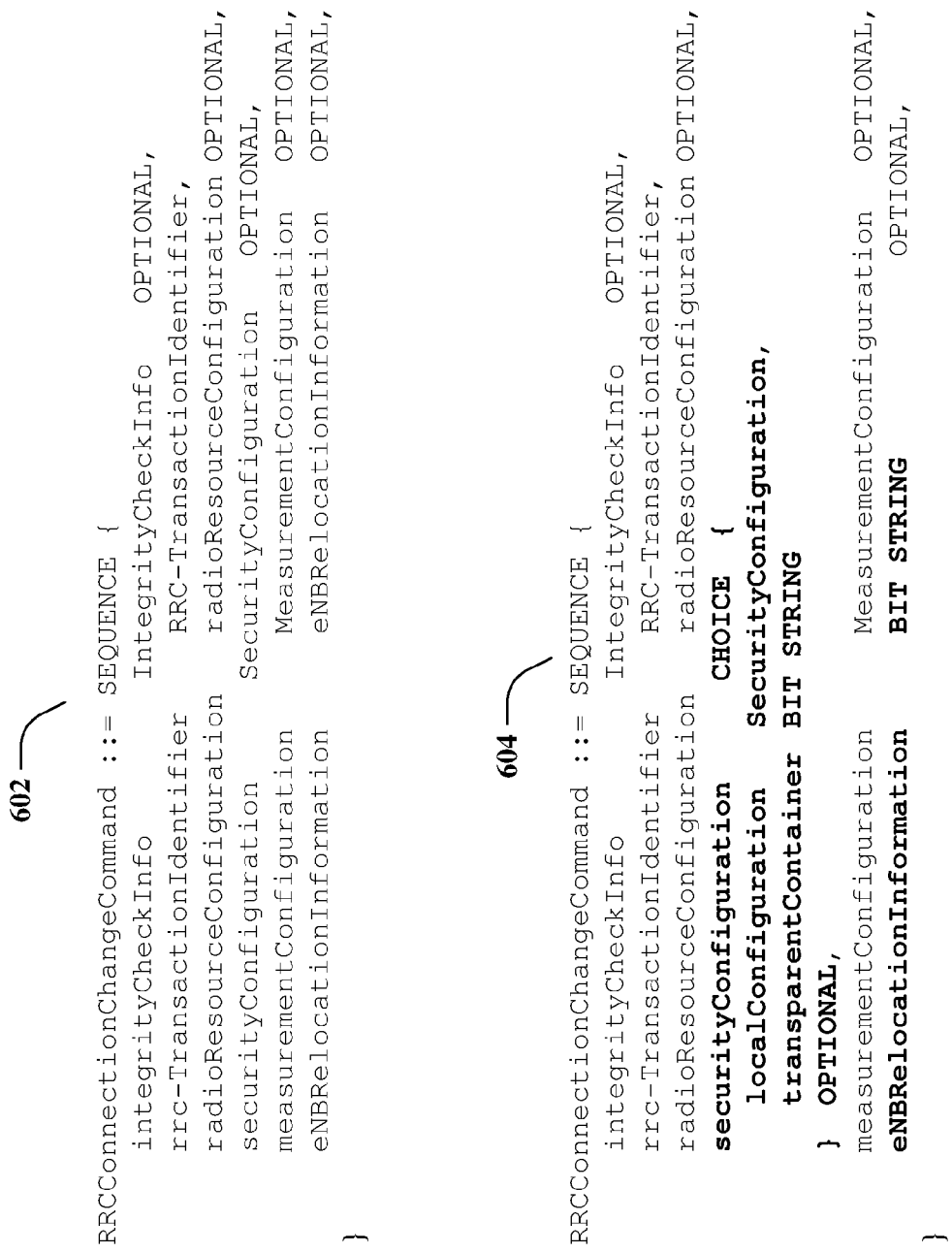
FIG. 6 shows embodiments of a RRC message in accordance with various aspects described herein.

FIG. 6 relates to an aspect of inter-eNB handover, wherein the radio configuration that is used in the target eNB is signaled from the target to the source eNB in a transparent container. Additionally, the HO Command message from the source eNB includes the transparent container. These indicate that the source eNB does not have to understand the detailed contents of the container. As mentioned supra, this mechanism allows the combination of the source and the target eNBs which may support different protocol version or may have different policy for radio configurations. In the figure, 602 is an equivalent of a RRC message in WCDMA system with the multiple instance of a top level IE (information element), for which an elementary procedure is specified. This works with the inter-eNB handover mechanism in which the relevant IEs are provided by the target eNB to the source eNB. In case of an inter-eNB handover, the source eNB places the transparent container received from the target eNB in the RRC CONNECTION CHANGE COMMAND message. This is achieved via the target eNB including a top level IE in the transparent container. Accordingly, for the top level IEs that may use the transparent container, a CHOICE between the local configuration by the source eNB and the transparent container can be specified as shown in the RRC CONNECTION CHANGE COMMAND message 604. Thus, the message 604 facilitates both inter-eNB handover with the transparent container as well as intra-eNB handover with the local configuration. In case of the later, a UE can move from one cell to another cell associated with the same eNB and therefore would not require the transparent container. In case of the former, the UE can decode the transparent container to find out which release of the protocol the container includes. This facilitates to have only the top level IEs (but not whole message) transferred on X2 interface (an additional interface defined between the eNBs in LTE which facilitates inter eNB handover). Hence, as seen from message 604, the CHOICE option separates top level IEs between local configuration wherein the UE stays with the same eNB and transparent container wherein the UE moves from one eNB to a different eNB.

While, for purposes of simplicity of explanation, the one or more methodologies shown herein, e.g., in the form of a flow chart, are shown and described as a series of acts, it is to be understood and appreciated that the present invention is not limited by the order of acts, as some acts can, in accordance with the present invention, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

Figure 7:
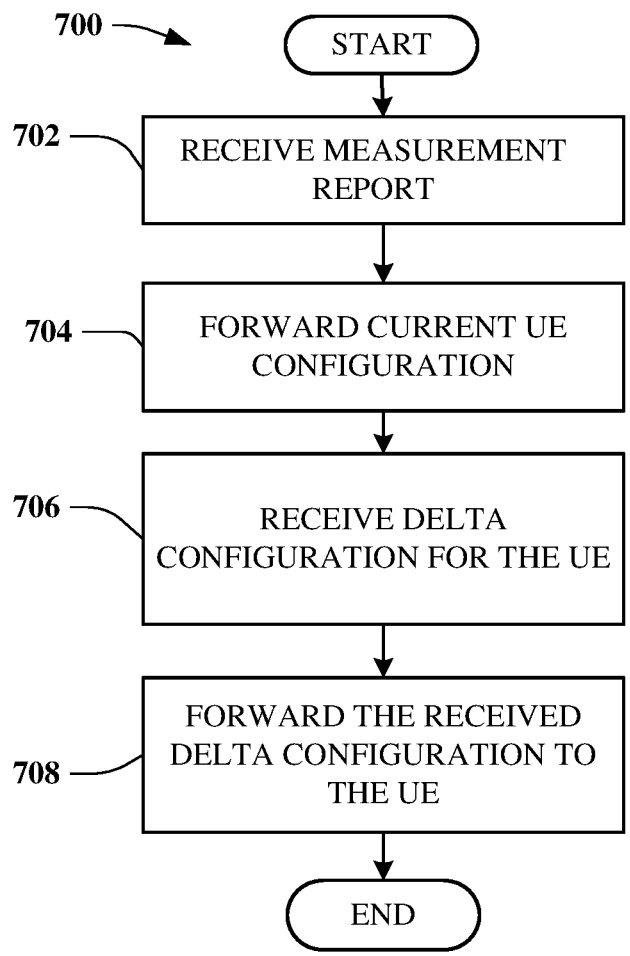
FIG. 7 relates to a method for executing an inter eNB handover in accordance with an aspect.

FIG. 7 relates to a method 700 for executing an inter eNB handover in accordance with an aspect. The method begins at 702 wherein a source eNB receives a measurement report from a UE comprising information regarding a preferred target eNB. At 704, a HO REQUEST message is forwarded by the source eNB to the preferred target eNB comprising information regarding the current configuration of the UE. At 706, the source eNB receives a HO REQUEST ACK message (handover request acknowledgment) from the target eNB. In a more detailed aspect, the acknowledgment message can comprise delta configuration wherein the target eNB compares the current UE configuration received in the HO REQUEST message and specifies the changes it requires in the current UE configuration as delta configuration in the acknowledgement message. In a further aspect, the delta configuration can be specified in a transparent container. At 708, the source eNB forwards the transparent container specifying the delta configuration to the UE via a HO COMMAND message. This message facilitates transfer of the UE from the source eNB to the target eNB. The transparent container mitigates the need for the source eNB to examine the details of the delta configuration to formulate the HO COMMAND message and instead the source eNB just forwards the transparent container to the UE in the HO COMMAND message. The process subsequently reaches the end block.

Figure 8A:
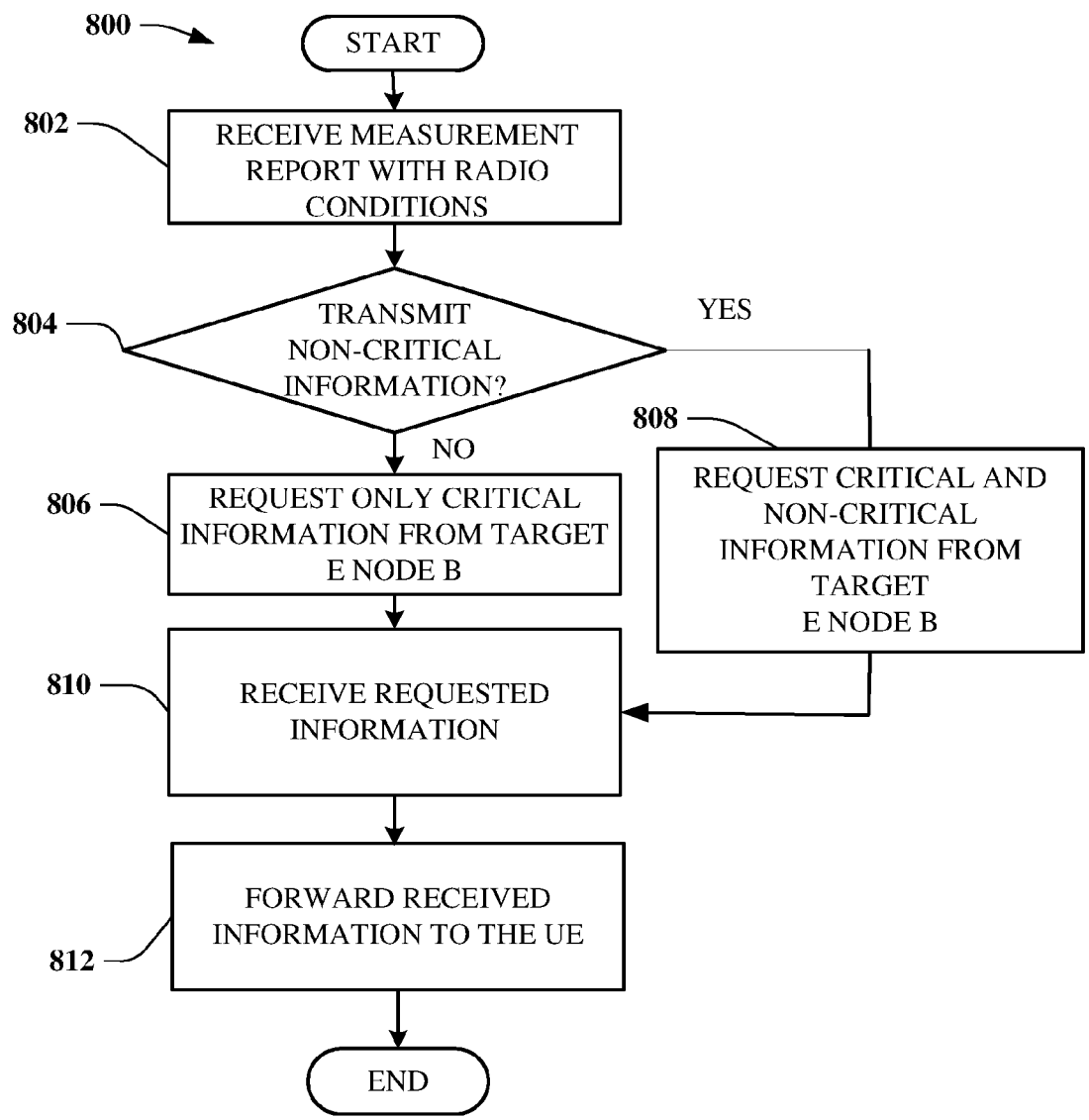
FIG. 8A relates to a methodology of transmitting critical and/or non-critical information from the target eNB to the UE in a inter eNB handover in accordance with an aspect.

FIG. 8A relates to a methodology 800 of transmitting critical and/or non- critical information from the target eNB to the UE in a inter eNB handover in accordance with an aspect. The procedure begins at 802 wherein a source eNB receives a message comprising a measurement report from a UE it serves. The measurement message indicates not only current radio conditions associated with the UE but also a target eNB that the UE prefers. Based at least on the radio conditions associated with the UE the source eNB determines the information that can be transmitted to the UE. More particularly, the source eNB determines if any non-critical information regarding the handover received from the target eNB can be transmitted to the UE as shown at 804. For example, if the UE has good SNR characteristics or favorable service terms, the source eNB can conclude that all information including critical and non-critical information can be transmitted to the UE. Conversely, if the UE is facing a paucity of resources then only information critical to conduct the handover may be transmitted to it. If the UE has favorable radio conditions, then the source eNB signals to the target eNB to communicate both critical and non-critical information for transmission to the UE as shown at 808, else only critical information is requested from the target eNB as shown at 806. This can be signaled by the source eNB in HO REQUEST message in accordance with an aspect. Upon transmitting an appropriate HO REQUEST message, the source eNB receives a HO REQUEST ACK message comprising requested information as shown at 810. This information is forwarded to the UE in a HO COMMAND message as indicated at 812. In accordance with a further aspect, the information is transmitted by the target eNB to the source eNB in a transparent container the contents of which are not examined by the source eNB and instead the source eNB just forwards the transparent container to the UE in a HO COMMAND message.

Figure 8B:
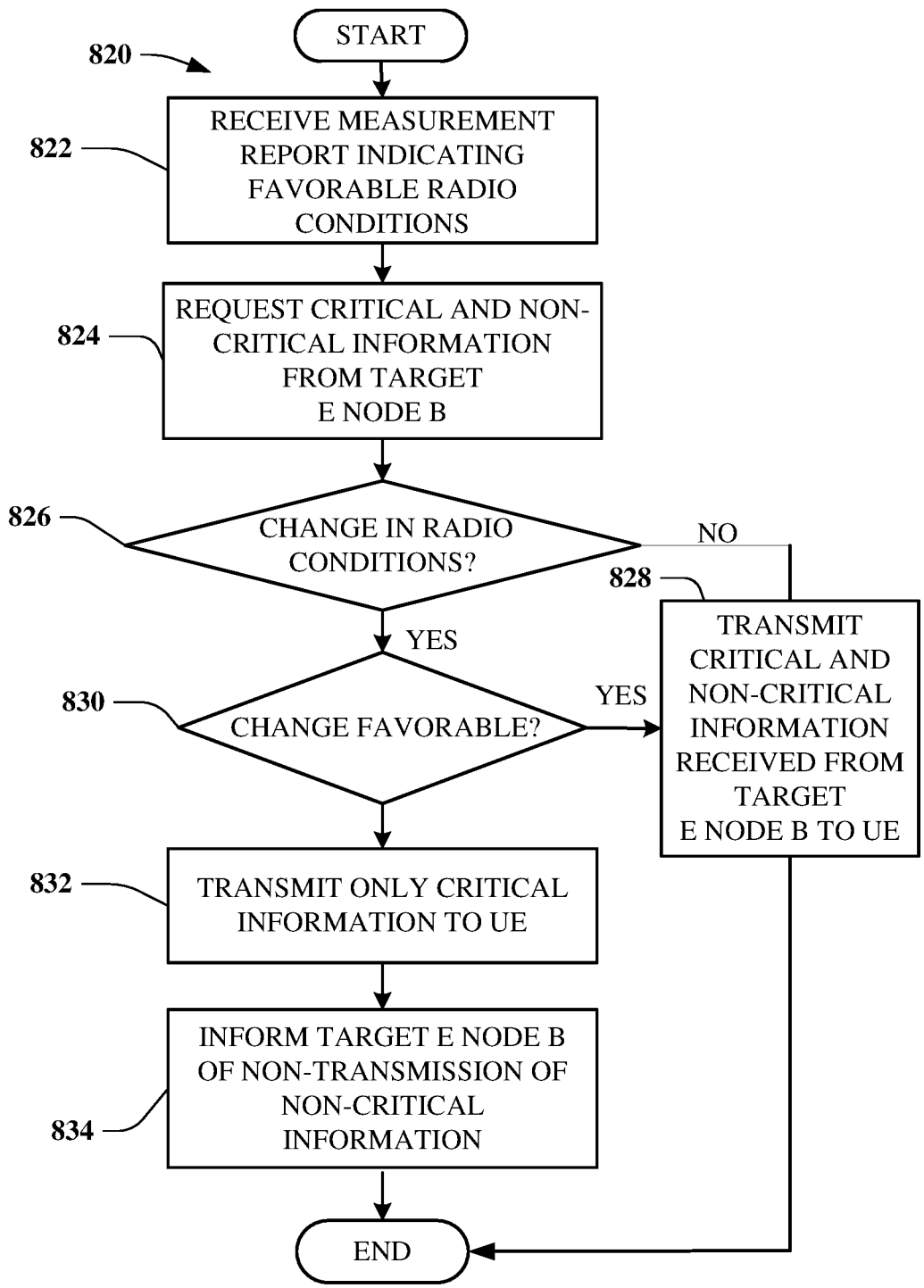
FIG. 8B relates to another aspect of transmitting critical/non-critical information to a UE by a source eNB in an inter-eNB handover procedure.

FIG. 8B depicts a flow chart 820 that relates to another aspect of transmitting critical/non-critical information to a UE by a source eNB in an inter-eNB handover procedure. The procedure begins at 822 where in the source eNB receives a measurement message from a UE indicating favorable radio conditions. Accordingly, at 824, the source eNB requests critical and non-critical information from a preferred target eNB. At 826, it is determined if the radio conditions associated with one or more of the source eNB or the UE have changed. If there is no change in radio conditions then all the information received from the target eNB is transmitted by the source eNB to the UE as shown at 828. If there is change in radio conditions associated with one or more of the UE or the source eNB, it is determined if the change is a favorable change as shown at 830. If the change is favorable, the process returns to 828 wherein all the received information comprising both critical and non-critical information is transmitted by the source eNB to the UE. However, if it is determined at 830 that the change is unfavorable, then, the source eNB transmits only the critical information as shown at 832. The target eNB is informed about the lack of communication of the non-critical information as shown at 834 and the procedure terminates at the stop block. Alternatively, the procedure can terminate without informing the target eNB and instead the UE informs the target eNB of all the information it received in a HO COMPLETE message it transmits.

Figure 9:
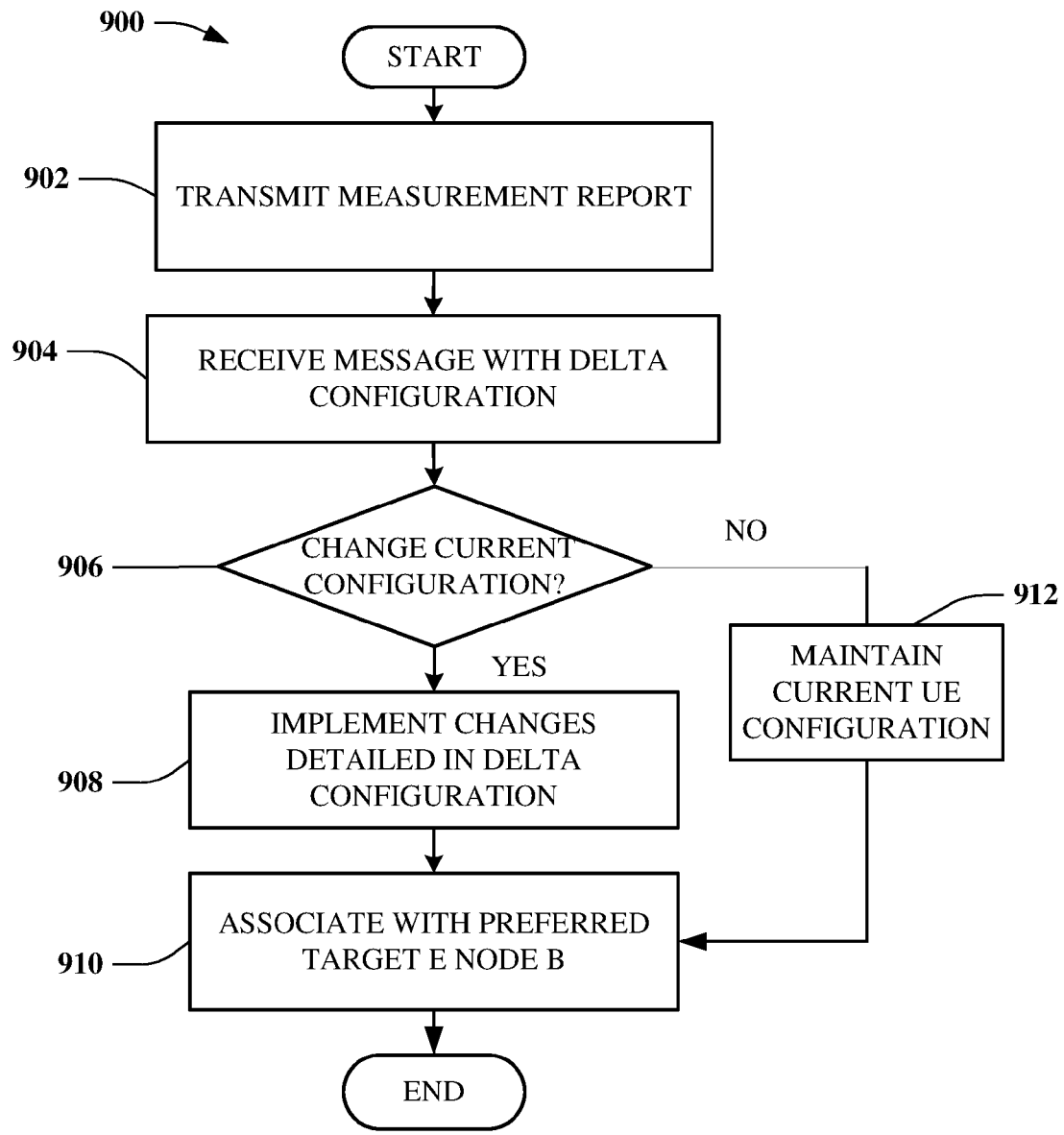
FIG. 9 is a flowchart of a methodology of executing a handover in accordance with an aspect.

FIG. 9 is a flowchart 900 of a methodology of executing a handover in accordance with an aspect. The method begins at 902 wherein a UE desiring a inter eNB handover transmits a message comprising a measurement report to a source eNB serving it. The measurement message comprises information regarding the radio conditions associated with the UE, its current configuration and a preferred target UE. In response, a HO COMMAND message is received from the source eNB as shown at 904, wherein the message comprises information regarding a delta configuration that details the changes to the current UE configuration in order to be transferred to the preferred target eNB. In accordance with a more detailed aspect, this configuration can be a delta configuration transmitted in a transparent container. In another aspect, the UE can be maintaining its current configuration wherein the contents of the transparent container cause no changes to the current UE configuration. Accordingly, at 906 it is determined if the UE should change any parameters associated with its current configuration. If yes, then the changes detailed in the received delta configuration in the HO COMMAND message are implemented as current configuration as shown at 908 and the UE is associated with the preferred target eNB as shown at 910. If at 906 it is determined that no changes are necessary to the current UE configuration, then the UE maintains its current configuration as shown at 912. The procedure moves to 910 wherein the UE associates with the preferred target eNB and the procedure subsequently terminates at the stop block. Although the method described herein details handover of a UE from one eNB to another eNB, it can be appreciated that it is not necessary for the UE to execute a inter eNB handover. The same procedure can be applied for a intra eNB handover when the UE moves in between cells associated with the same eNB.

Figure 10:
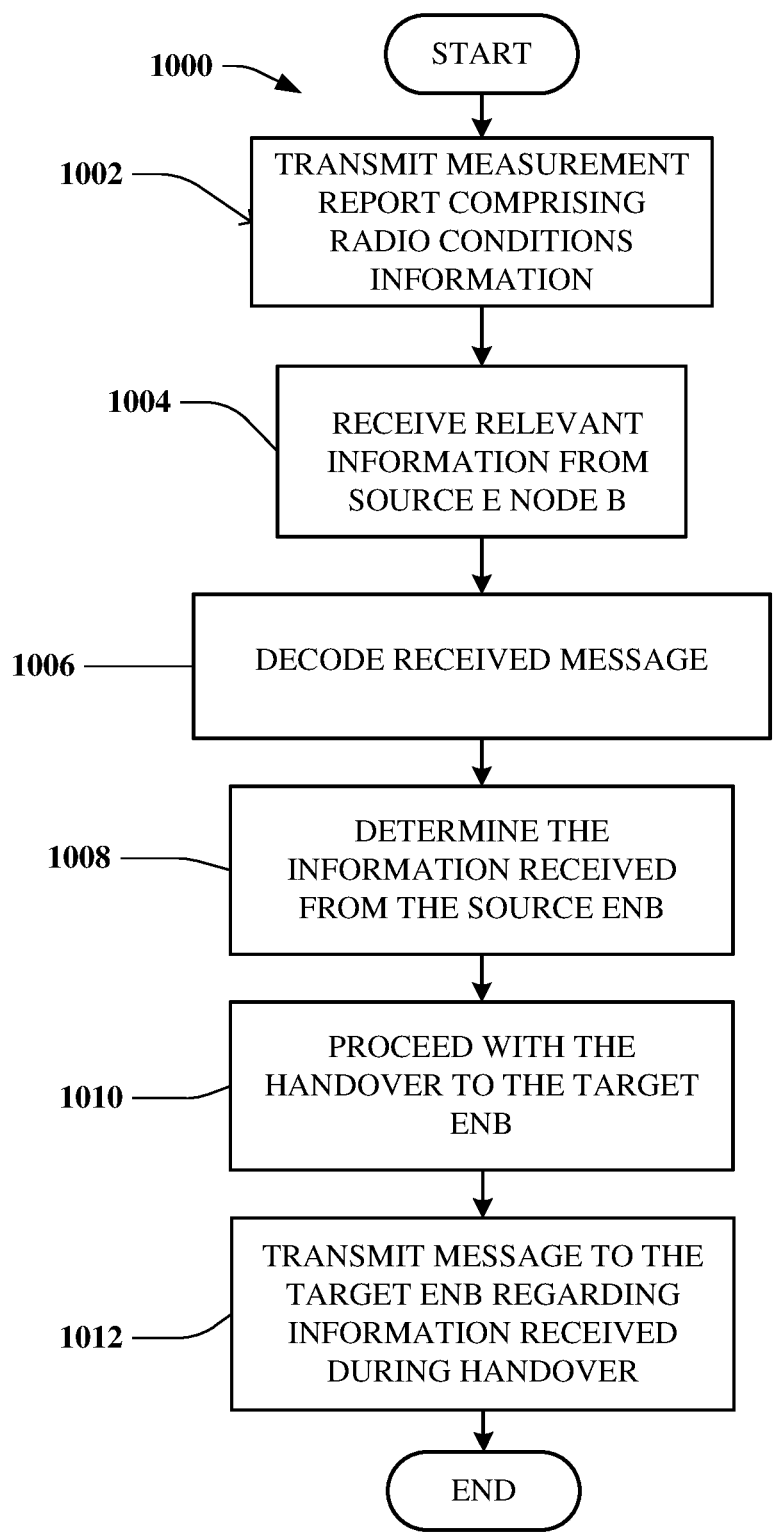
FIG. 10 is a flowchart of a methodology of receiving information in accordance with an aspect.

FIG. 10 is a flowchart 1000 of a methodology of receiving information in accordance with an aspect. The method begins at 1002 wherein a UE that requires a inter eNB handover transmits a measurement report to its source eNB. The measurement report can comprise information regarding the radio conditions associated with the UE and a target eNB preferred by the UE. Based on the received measurement report, the source eNB determines if the UE can receive critical and non-critical information from the preferred target eNB or if only critical information should be forwarded. Accordingly, a HO COMMAND message is received by the UE at 1004 which comprises information included by the source eNB based upon its perception of the radio conditions from the measurement report. At 1006, the message received from the source eNB is decoded and at 1008 the information transmitted is determined. The method proceeds with the handover to the preferred target eNB as show at 1010. At 1012, upon completion of the handover, the UE transmits the information it received from the source eNB in a HO COMPLETE message to the target eNB, thereby informing the target eNB of the reception/lack of reception of the non-critical information.

Figure 11:
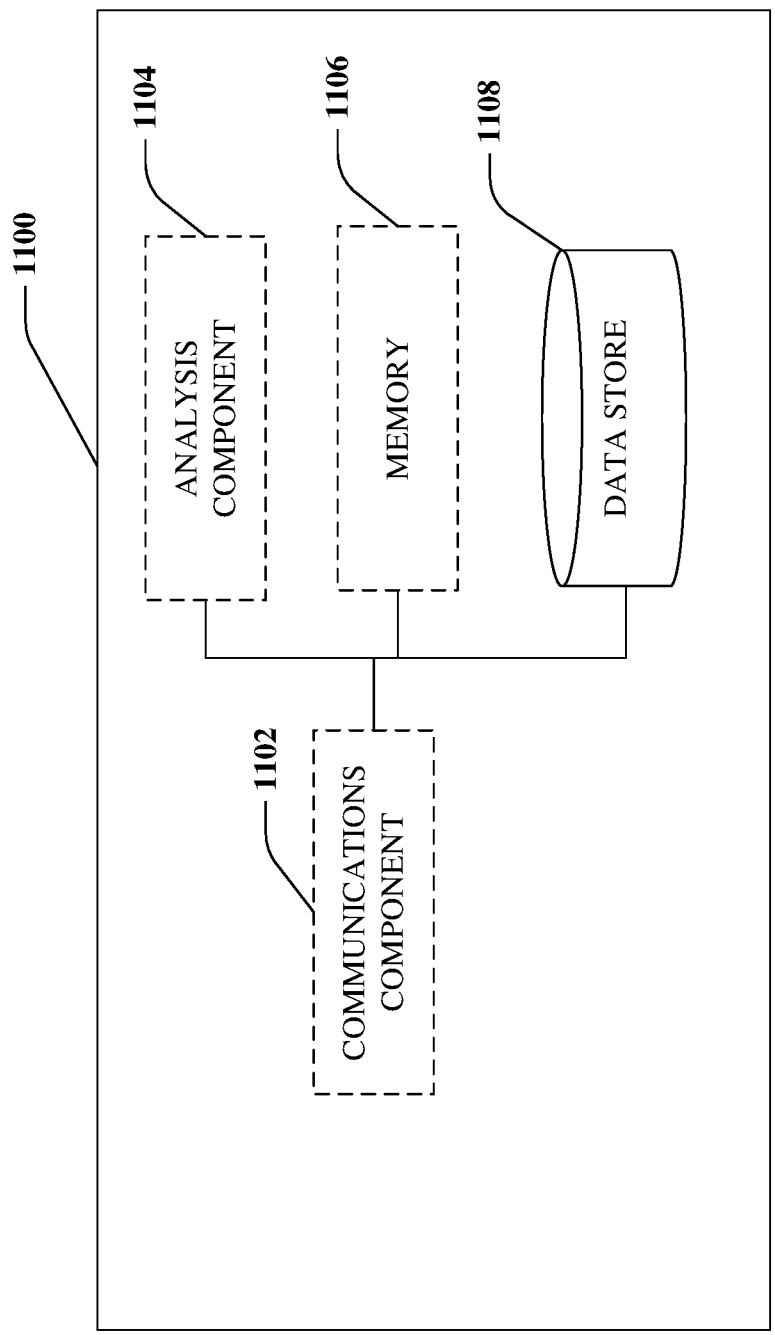
FIG. 11 illustrates a high-level system diagram of various components of a device in accordance with various aspects.

FIG. 11 illustrates a high-level system diagram of various components of a device in accordance with various aspects. It is to be appreciated that the device 1100 may be an eNode B, a UE, or a combination thereof. It comprises a communications component 1102 that facilitates receiving and transmitting communications to various entities utilizing hardware, software, and services as described herein. Although the communications component 1102 is depicted as a single entity, it may be appreciated separate transmission and reception components can be employed for sending and receiving communications. In accordance with an aspect the device 1100 can act as an eNode B and the communications component 1102 receives communications from various UEs relating to one or more of resource requests, data transmissions etc. An analysis component 1104 analyzes the communications received from various UEs to identify any UEs that are requesting handovers. The analysis component 1104 can include a single or multiple set of processors or multi-core processors wherein the processors can carry out other operations such as decoding messages received from the UEs to determine radio conditions associated therewith or for determining a preferred target eNB for a UE requesting a handover, formulating messages for requesting handovers, or generating information for facilitating handovers such as generating delta configurations for UEs. Moreover, the analysis component 1104 can be implemented as an integrated processing system and/or a distributed processing system. The information gathered by the analysis component 1104 can be stored in the memory 1106/data store 1108 for further processing. Memory 1106 can include random access memory (RAM), read only memory (ROM), or a combination thereof. Data store 1108 can be any suitable combination of hardware and/or software that provides for mass storage of information, databases, and programs employed in connection with aspects described herein.

Figure 12:
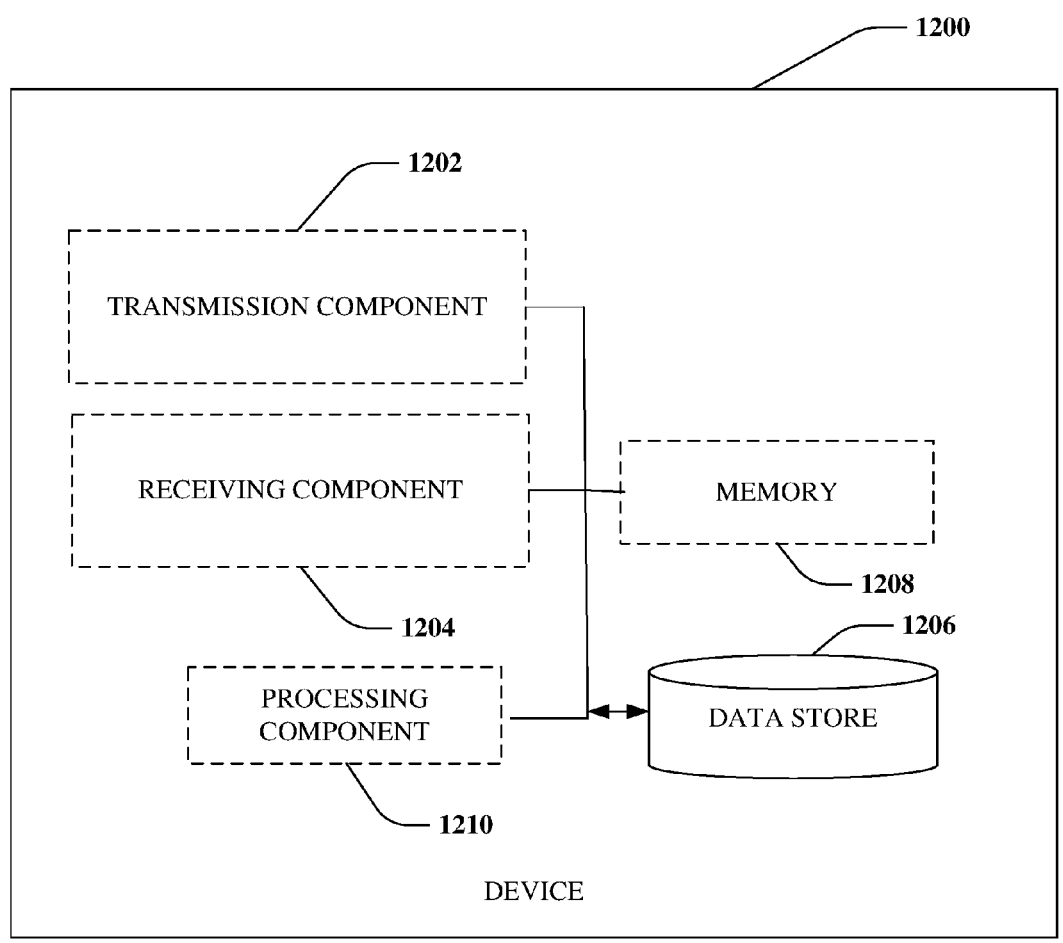
FIG. 12 is another high level diagram illustrating various components of a device in accordance with different aspects described herein.

FIG. 12 is another high level diagram illustrating various components of a device 1200 in accordance with different aspects described herein. The device 1200 can be an eNode B, an UE or a combination thereof. The device comprises a transmission component 1202 for transmitting various communications. If the device is acting as an UE then the transmission component 1202 can transmit various communications on the uplink to a serving eNode B/base station. The communications can include resource requests, data transmission on assigned resources, or other control communications such as measurement reports communicating radio conditions, or preferred target eNBs for handover etc. The device also comprises a receiving component 1204 for receiving communications from various entities including eNode B, other UEs or combinations thereof. In accordance with an aspect, the device 1200 can receive transmissions of control messages such as HO COMMAND messages upon transmitting measurement reports requesting handover. These messages can be stored in the data store 1206. Data store 1206 can be any suitable combination of hardware and/or software that provides for mass storage of information, databases, and programs employed in connection with aspects described herein. The device 1200 may optionally comprise a volatile/non-volatile memory 1208 including random access memory (RAM), read only memory (ROM), or a combination thereof. The received messages are decoded and processed by a processing component 1210. In accordance with an aspect, the messages relating to handovers can comprise one or more of critical or non- critical information to facilitate the handover. The information decoded from such control messages can be stored in the memory 1208 and/or data store 1206 and employed by the processing component 1210 for controlling handover or other procedures.

Next, systems that can enable aspects of the disclosed subject matter are described in connection with FIGS. 13 and 14. Such systems can include functional blocks, which can be functional blocks that represent functions implemented by a processor or an electronic machine, software, or combination thereof (e.g., firmware).

Figure 13:
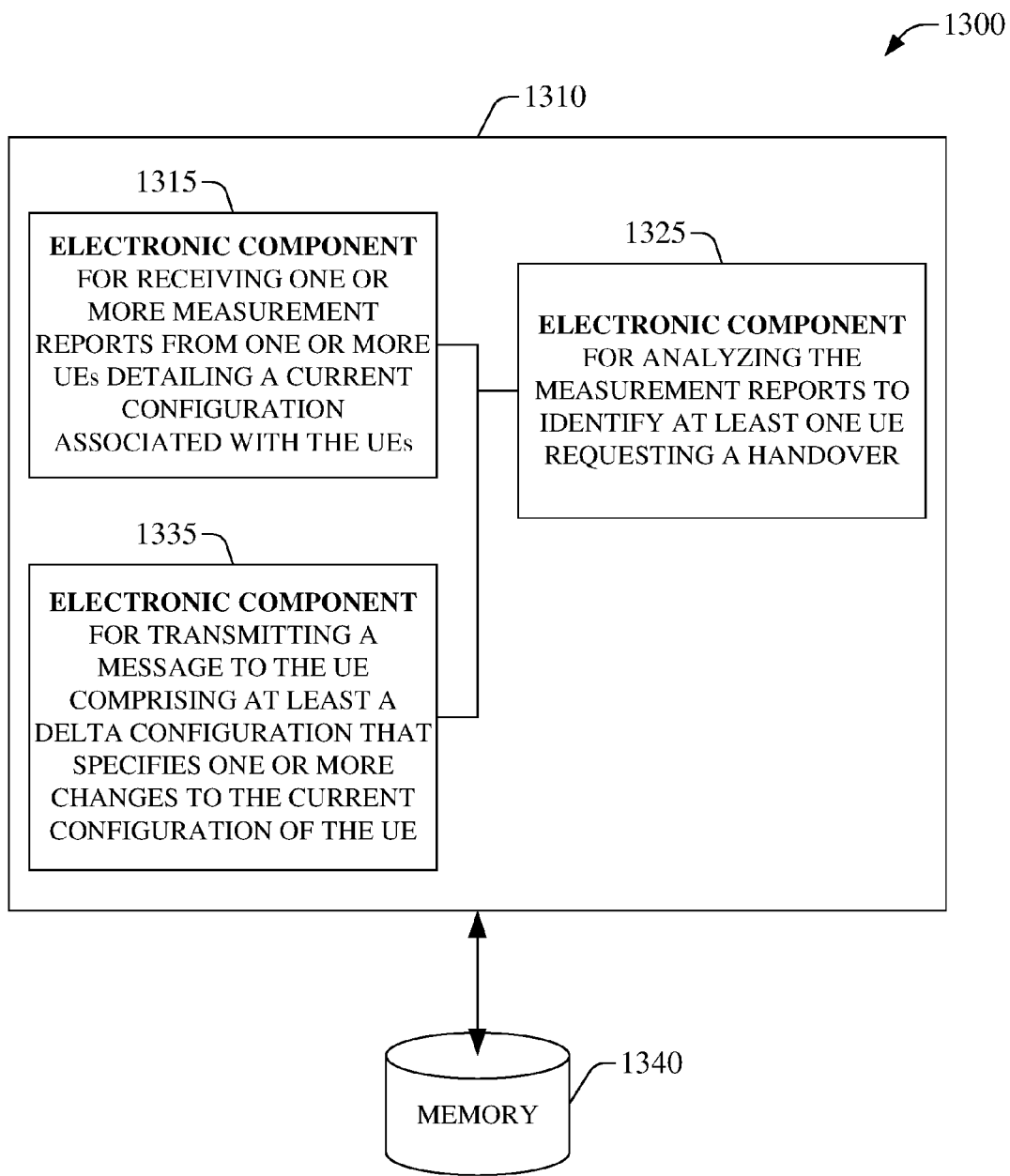
FIG. 13 illustrates a block diagram of an example system that enables handover in accordance with aspects disclosed in the subject specification.

FIG. 13 illustrates a block diagram of an example system 1300 that enables handover in accordance with aspects disclosed in the subject specification. System 1300 can reside at least partially within a base station, for example. System 1300 includes a logical grouping 1310 of electronic components that can act in conjunction. In an aspect of the subject innovation, logical grouping 1310 includes an electronic component 1315 for receiving one or more measurement reports from one or more UEs detailing a current configuration associated with the UEs; an electronic component 1325 for analyzing the measurement reports to identify at least one UE requesting a handover; and an electronic component 1335 for transmitting a message to the UE comprising at least a delta configuration that specifies one or more changes to the current configuration of the UE.

System 1300 can also include a memory 1340 that retains instructions for executing functions associated with electrical components 1315, 1325, and 1235, as well as measured or computed data that may be generated during executing such functions. While shown as being external to memory 1340, it is to be understood that one or more of electronic components 1315, 1325, and 1335, and can exist within memory 1340.

Figure 14:
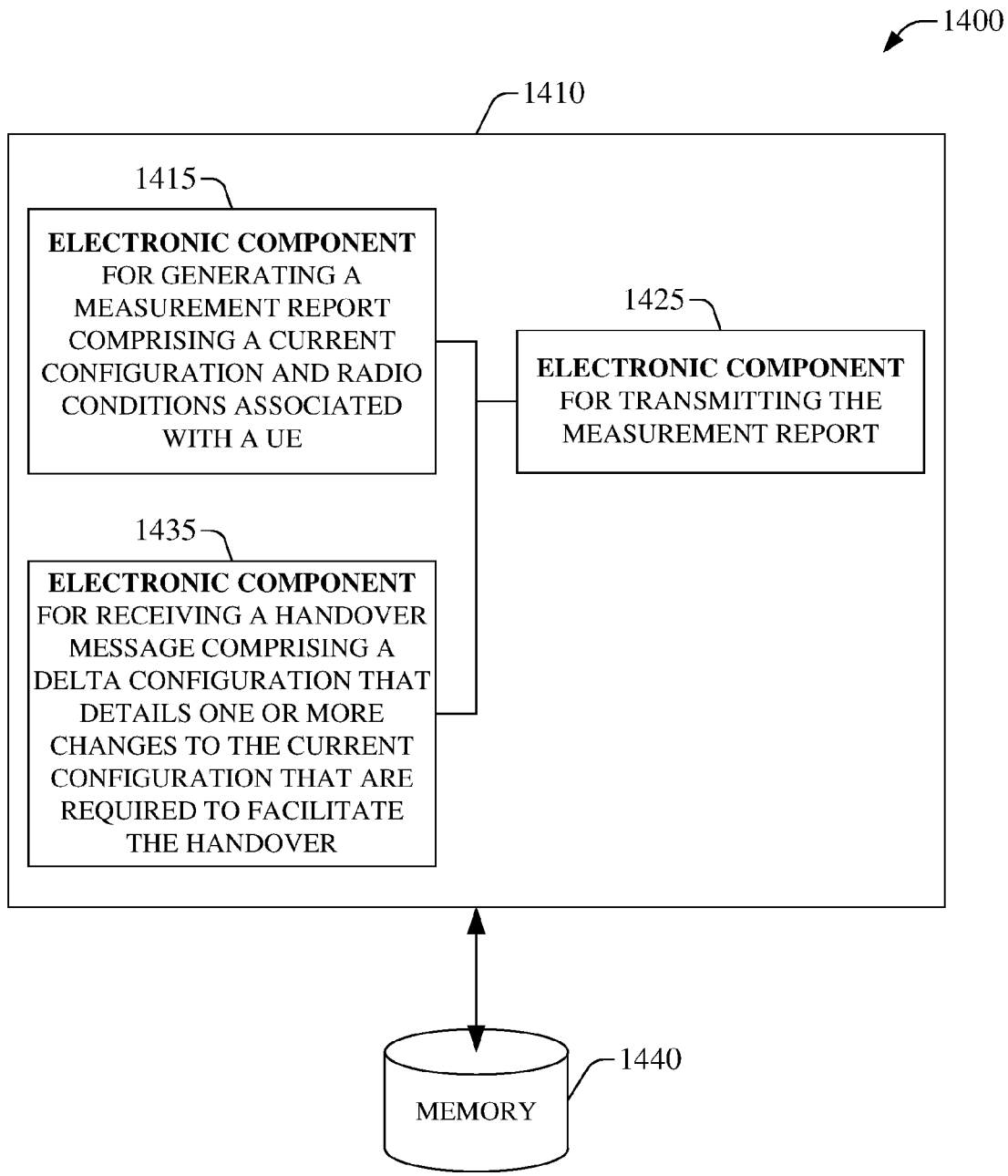
FIG. 14 illustrates a block diagram of an example system that enables an inter eNode B handover in accordance with aspect described in the subject specification.

FIG. 14 illustrates a block diagram of an example system 1400 that enables an inter eNB handover in accordance with aspect described in the subject specification. System 1300 can reside at least partially within a mobile, for example. System 1400 includes a logical grouping 1410 of electronic components that can act in conjunction. In an aspect of the subject innovation, logical grouping 1410 includes an electronic component 1415 for generating a measurement report comprising a current configuration and radio conditions associated with a UE; an electronic component 1425 for transmitting the measurement report; and an electronic component 1435 for receiving a handover message comprising a delta configuration that details one or more changes to the current configuration that are required to facilitate the handover.

System 1400 can also include a memory 1440 that retains instructions for executing functions associated with electrical components 1415, 1425 and 1435, as well as measured or computed data that may be generated during executing such functions. While shown as being external to memory 1440, it is to be understood that one or more of electronic components 1415, 1425 and 1435, and can exist within memory 1440.

What has been described above includes examples of the various embodiments. It is, of course, not possible to describe every conceivable combination of components or methodologies for purposes of describing the embodiments, but one of ordinary skill in the art may recognize that many further combinations and permutations are possible. Accordingly, the detailed description is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In this regard, it will also be recognized that the embodiments includes a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A method of wireless communication, comprising:
transmitting, by a user equipment (UE), a measurement report to a source enhanced node B (eNB) that stores a current configuration of the UE;
receiving, by the UE, a handover command from the source eNB that comprises a delta configuration;
comparing, by the UE, the delta configuration to the current configuration;
implementing, by the UE, the delta configuration based at least in part on a result of the comparing to establish a new configuration for use at a target eNB; and
communicating, by the UE, with the target eNB using the new configuration.

2. The method of claim 1, wherein the delta configuration comprises:
a configuration generated by the target eNB in connection with a handover of the UE from the source eNB to the target eNB.

3. The method of claim 1, wherein the source eNB supports a first protocol version and the target eNB supports a second protocol version different from the first protocol version.

4. The method of claim 3, wherein the delta configuration comprises:
a configuration based at least in part on the second protocol version.

5. The method of claim 1, wherein receiving the handover command comprises:
receiving the delta configuration in a transparent container.

6. The method of claim 1, wherein the delta configuration comprises:
an indication of one or more changes to the current configuration.

7. The method of claim 1, wherein the delta configuration comprises:
a configuration reduced in size from the new configuration.

8. The method of claim 1, wherein receiving the handover command comprises:
receiving the handover command in a radio resource control (RRC) message.

9. The method of claim 8, wherein the RRC message comprises:
configuration information to facilitate mobility between the source eNB and the target eNB.

10. The method of claim 9, wherein the RRC message comprises:
an RRC connection change command message.

11. The method of claim 10, wherein the delta configuration comprises:
an information element to facilitate placing the delta configuration in the RRC connection change command message.

12. The method of claim 1, wherein the measurement report comprises:
an identification of a preferred target eNB.

13. The method of claim 1, wherein the measurement report comprises:
an identification of the target eNB.

14. The method of claim 13, wherein communicating with the target eNB using the new configuration is based at least in part on the identification.

15. The method of claim 1, wherein the measurement report comprises:
radio condition information associated with the UE.

16. The method of claim 1, wherein the source eNB supports a first radio configuration policy and the target eNB supports a second radio configuration policy different from the first radio configuration policy.

17. An apparatus for wireless communication, in a system comprising:
a processor;
memory in electronic communication with the processor; and
instructions stored in the memory and operable, when executed by the processor, to cause the apparatus to:
transmit a measurement report to a source enhanced node B (eNB) that stores a current configuration of a UE;
receive a handover command from the source eNB that comprises a delta configuration;
compare the delta configuration to the current configuration;
implement the delta configuration based at least in part on a result of the comparing to establish a new configuration for use at a target eNB; and
communicate with the target eNB using the new configuration.

18. The apparatus of claim 17, wherein the delta configuration comprises:
a configuration generated by the target eNB in connection with a handover of the UE from the source eNB to the target eNB.

19. The apparatus of claim 17, wherein the source eNB supports a first protocol version and the target eNB supports a second protocol version different from the first protocol version.

20. The apparatus of claim 17, wherein the delta configuration comprises:
a configuration based at least in part on the second protocol version.

21. The apparatus of claim 17, wherein the instructions to receive the handover command are further executable by the processor to:
receive the delta configuration in a transparent container.

22. The apparatus of claim 17, wherein the delta configuration comprises:
an indication of one or more changes to the current configuration.

23. The apparatus of claim 17, wherein the delta configuration comprises:
a configuration reduced in size from the new configuration.

24. The apparatus of claim 17, wherein the instructions to receive the handover command are further executable by the processor to:

receive the handover command in a radio resource control (RRC) message.

25. The apparatus of claim 24, wherein the RRC message comprises:
configuration information to facilitate mobility between the source eNB and the target eNB.

26. The apparatus of claim 25, wherein the RRC message comprises:
an RRC connection change command message.

27. The apparatus of claim 26, wherein the delta configuration comprises:
an information element to facilitate placing the delta configuration in the RRC connection change command message.

28. The apparatus of claim 17, wherein the measurement report comprises:
an identification of a preferred target eNB.

29. An apparatus for wireless communication, comprising:
means for transmitting a measurement report to a source enhanced node B (eNB) that stores a current configuration of a UE;
means for receiving a handover command from the source eNB that comprises a delta configuration;
means for comparing the delta configuration to the current configuration;
means for implementing the delta configuration based at least in part on a result of the comparing to establish a new configuration for use at a target eNB; and
means for communicating with the target eNB using the new configuration.

30. A non-transitory computer readable medium storing code for wireless communication, the code comprising instructions executable by a processor to:
transmit a measurement report to a source enhanced node B (eNB) that stores a current configuration of a UE;
receive a handover command from the source eNB that comprises a delta configuration;
compare the delta configuration to the current configuration;
implement the delta configuration based at least in part on a result of the comparing to establish a new configuration for use at a target eNB; and
communicate with the target eNB using the new configuration.

* * * * *